United States Patent [19]

Paranjpe et al.

[11] Patent Number: 5,422,723
[45] Date of Patent: Jun. 6, 1995

[54] DIFFRACTION GRATINGS FOR SUBMICRON LINEWIDTH MEASUREMENT

[75] Inventors: Ajit P. Paranjpe; Phillip Chapados, Jr., both of Plano; Jimmy W. Hosch, Dallas, all of Tex.

[73] Assignee: Texas Instruments Incorporated, Dallas, Tex.

[21] Appl. No.: 948,194

[22] Filed: Sep. 21, 1992

[51] Int. Cl.$^6$ .................................................. G01B 9/02
[52] U.S. Cl. .................................... 356/355; 356/357; 356/384
[58] Field of Search ............... 356/354, 355, 356, 363, 356/384, 400, 401

[56] References Cited

U.S. PATENT DOCUMENTS 4,330,213  5/1982  Kleinknecht et al. .

OTHER PUBLICATIONS

"Continuous Optical Measurement of the Dry Etching of Silicon Using the Diffraction of a Lamellar Grating", Geraldo F. Mendes, Lucila Cescato, Jaime Frejlich, Edmondo S. Braga, and Alaide P. Mammana, *J. Electrochem. Soc.: Solid-State Science and Technology*, Jan. 1985, pp. 190–193.

"In Situ Wafter Monitoring for Plasma Etching", Dennis S. Grimard, Fred L. Jerry, Jr., and Michael E. Elta, University of Michigan, Department of Electronic Engineering and Computer Science, 1301 Beal Ave., Ann Arbor, Mich. 48109–2122.

"Optical Monitoring of the Etching of SiO$_2$ and Si$_8$N$_4$ on Si by the Use of Grating Test Patterns", H. P. Kleinknecht and H. Meier, *J. Electrochem. Soc.: Solid-State Science and Technology*, May 1978, pp. 798–803.

"A Simple Technique for Linewidth Measurement of Gratings on Photomasks", S. Sohail H. Naqvi, Susan Gasper, Kirt Hickman, and John R. McNeil, Center for High Technology Materials, University of New Mexico, Albuquerque, N. Mex. 87131.

"In Situ Monitoring of Sub-micron Linewidths using a Diffraction Grating Test Pattern", Phillip Chapados, Ajit Paranjpe, Jimmy Hosch, and Cecil Davis, Texas Instruments Inc.

*Primary Examiner*—Samuel A. Turner
*Attorney, Agent, or Firm*—Peter T. Rutkowski; Richard L. Donaldson; William E. Hiller

[57] ABSTRACT

A test structure and a method of using it for measuring submicron linewidths. Diffraction gratings are made with lines having an unknown linewidth. The grating has a pitch comprises of multiple lines and multiple spaces. This permits a wider "effective pitch" resulting in an increased number of observable diffraction orders. Each order provides an intensity measurement, which can be substituted into a diffraction intensity equation in which intensity is a function of linewidth and other unknown variables. At least as many intensity measurements are obtained as are unknown variables so that a system of equations can be solved for the linewidth. In practice, if the grating lines are made in the same manner as other lines of a product, the width of the latter can be inferred.

20 Claims, 2 Drawing Sheets

DIFFRACTION GRATINGS FOR SUBMICRON LINEWIDTH MEASUREMENT

TECHNICAL FIELD OF THE INVENTION

This invention relates to manufacturing process control, and more particularly to designing and using diffraction gratings for measuring the linewidth of applied or removed strips of material.

BACKGROUND OF THE INVENTION

Integrated circuit fabrication is only one example of a manufacturing process that requires close tolerances of the width of features produced on the wafer. For example, it is important that the width of etched features during processing be controlled within certain critical dimension limits.

Today's wafer fabrication processes include real-time process control steps as a part of the manufacturing process. This permits appropriate adjustments to be made. Ideally, linewidth monitoring is performed in-situ on a wafer-by-wafer basis.

A number of existing techniques may be used to perform linewidth measurements. Techniques based on ordinary microscopes are satisfactory when the line widths are about 1.5 micrometers or larger. For submicron measurements, older methods use scanning electron microscopy. A problem with this method is that it is neither real time nor in-line, and thus is not conducive to wafer by wafer process control.

A recently developed linewidth measurement method uses test patterns in the form of diffraction gratings, which are placed in a test area of the wafer. Depending on whether the substrate being tested is transparent, the incident light is reflected or transmitted to generate diffraction beams. The gratings are monitored during fabrication by illuminating the grating with monochromatic light, such as from laser beam, and analyzing the resulting diffraction pattern to determine its linewidth. If the lines of the grating are made in the same manner as features on the rest of the wafer, measurement of the grating linewidth can be used to infer the sizes of the other features on the wafer.

A linewidth measurement system using a diffraction grating is described in U.S. Pat. No. 4,330,213 to Kleinknecht, et al. The system obtains the intensity of first and second order light and uses the following equation to determine the linewidth, lw:

$$lw = d/\pi \cos^{-1}(I2/I1)^{\frac{1}{2}},$$

where d is the grating period (linewidth plus spacewidth), and I1 and I2 are measured intensities of the first and second diffraction orders.

The advantage of using intensity ratios is that many factors that affect intensity drop out of the equation. However, a limitation of many existing diffraction methods is that they require the measurement of more than one order of diffraction. The more complex the diffraction model, in the sense of having several unknown variables, the more diffraction orders are needed to solve for linewidth.

The number of observable diffraction orders is a function of the pitch of the grating. Increasing the pitch relative to the wavelength of the light permits a larger number of diffraction orders to be observed. If conventional light sources such as visible or near ultraviolet are to be used, the existing methods require large pitch values to obtain multiple orders. When the required pitch is large relative to the linewidth to be measured, the spacewidth must be wide. However, the use of large spacewidths to create large pitches is detrimental to meaningful measurements because actual devices do not have such configurations.

A need exists for a method of providing multiple diffraction orders for diffraction intensity measurements. The method should provide for in-situ monitoring as a part of wafer process control.

SUMMARY OF THE INVENTION

One aspect of the invention is a diffraction grating for determining an unknown linewidth on a surface having lines and spaces of different transmissivity or reflectivity, or other diffraction producing characteristic. The grating has lines of a uniform unknown width. Its pitch is comprised of multiple lines and spaces, the spaces having widths in patterns that repeat for each pitch, such that the grating produces multiple (three or more) closely spaced diffraction orders when illuminated.

The method aspects of the invention involve making the grating to measure the unknown linewidth of the grating. The multiple diffraction orders are used to determine linewidth by providing known data to solve a system of equations representing diffraction intensity. Thus, to use the grating, it is illuminated with incident light. The intensity from each of the diffraction orders is measured. The number of intensity measurements must match or exceed the number of unknown values in a given mathematical expression representing diffraction intensity as a function of linewidth. The result is a set of equations that can be solved for the grating linewidth. If the grating lines have been made in the same manner as other features on the wafer that are not in the grating, the width of the latter can be inferred from the width of the grating lines.

Another embodiment of the invention uses adjacent grating strips. Like the gratings having multi-line multi-space pitchwidths, this "stacked" grating produces multiple diffraction orders that are easily observable.

A technical advantage of the invention is that it provides for in-situ monitoring of submicron linewidths. The test grating can be placed on the actual production item. The diffraction orders are closely spaced, and therefore easily observable on a image screen, which may be placed outside the production chamber of products such as semiconductor wafers. The method can be performed in "real time" in the sense that during those line-making processes that involve gradual increases or decreases of width until a desired width is obtained, measurements can be taken during the line-making process and the process stopped once the desired line width is obtained. Furthermore, the measurements can be used not only to control a particular step, but for feed-forward control of subsequent steps and feed-back control of prior steps.

DETAILED DESCRIPTION OF THE INVENTION

Figure 1:
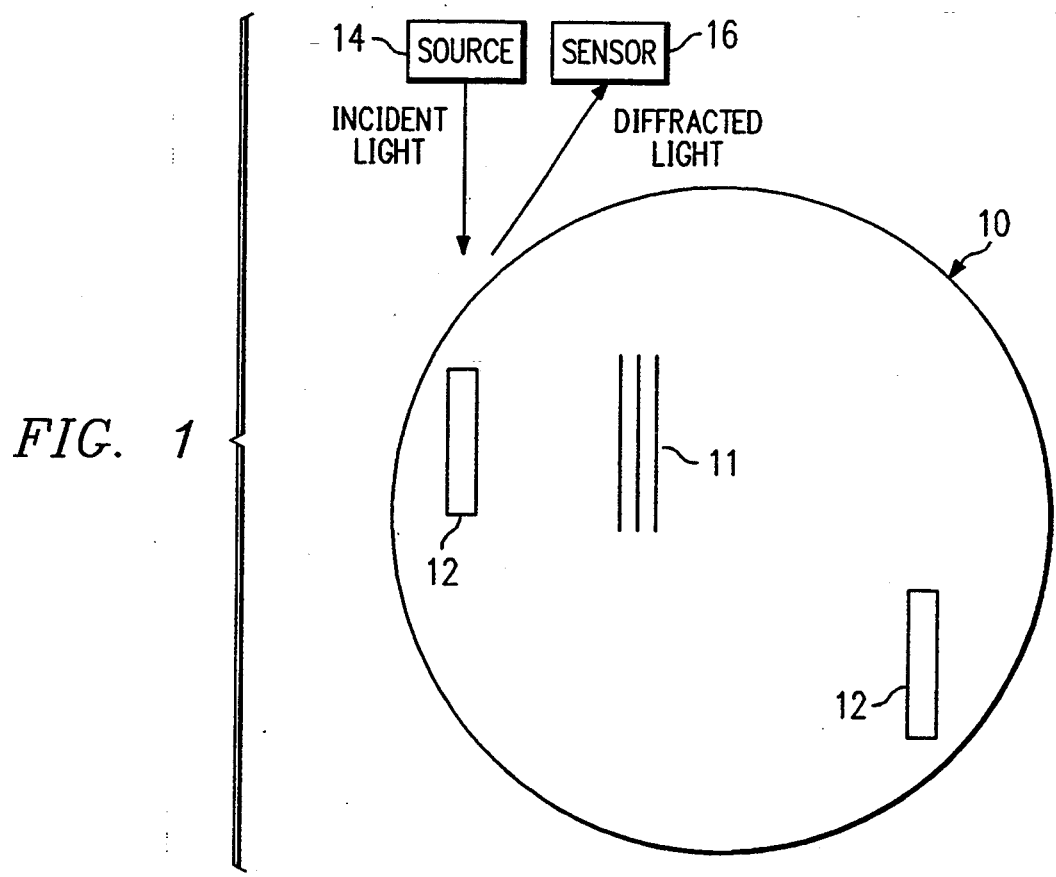
FIG. 1 illustrates the surface of a production item having lines or spaces whose width is to be measured, and having two test gratings.

FIG. 1 illustrates the surface of a production item 10, such as a semiconductor wafer, on which lines 11 are produced. Item 10 has two multiple-order gratings 12 in accordance with the invention. Item 10 might also have only one grating 12 or more than two gratings 12. As explained below in connection with FIGS. 2-4, each grating 12 is a set of fixed-linewidth diffraction gratings, whose lines have a width similar to the width of lines 11. Gratings 12 have a special pattern of nonuniformly spaced lines that permits observation of more diffraction orders, than does a conventional grating having uniformly spaced lines.

In a typical application, grating 12 is made during any production stage that involves making lines 11 on the surface of item 10. In FIG. 1, lines 11 are greatly enlarged relative to item 10, and would typically be of the order of a micron or less.

Examples of production stages in which grating 12 might be made are during semiconductor fabrication, when lines are to be made to precise widths during resist patterning, etching, or metallization. In a related application, grating 12 could be made on a mask during mask production to measure the width of the mask lines. In any event, in a most general sense, grating 12 could be placed on any item 10 on which lines having widths in the order of a micron or less are being made, either by depositing material or removing it.

As will be explained below, grating 12 has lines that are made in the same manner as the lines 11 on the rest of the surface of item 10. Regardless of when or how the grating lines are made, the assumption is that the width of the lines on grating 12 are sufficiently similar to the width of lines 11 such that measurement of the grating lines can be used to infer the width of lines 11. Typically, the grating lines are used to measure the most narrow lines 11 on item 10. Usually, grating 12 will be made on a surface that is the same as the rest of the surface of item 10, however, it is conceivable that this might not be the case. For example, grating 12 might be placed on a transmissive "window" in a wafer, whose remaining surface is reflective. However, any such differences affect the intensity of diffracted light, and these differences must be accounted for.

The location of gratings 12 on item 10 is not important to the invention; they may be placed at any convenient place. Where item 10 is a semiconductor wafer, they might, for example, be placed in a corner of the actual production chips or be placed in process control areas between the actual production chips, or in some other area that is not used for production of the chips themselves.

Gratings 12 may be made and used at any phase of production where lines are produced. For multi-layer production items, such as semiconductor wafer, more than one set of gratings 12 may be used at different stages on different layers. In the language of integrated circuit manufacture, gratings 12 could be referred to as a type of "test structure".

The size of grating 12 may vary, depending on the size of item 10 and the width of the lines 11 to be measured. If item 10 is a wafer of a size common in production today, a typical grating 12 might be 5 mm × 1 mm in size.

Depending on the nature of item 10 and the type of lines being made, grating 12 can model different types of diffraction gratings. If its lines and spaces exhibit different transmissivities, such as when grating 12 is made on a mask glass to measure mask lines, it models a transmissive diffraction grating. If its lines and spaces exhibit different reflectivities, such as when grating 12 is being used to measure etched lines on a semiconductor wafer substrate, it models a reflective diffraction grating. Finally, if the reflectivities and transmissivities are the same, but a phase shift is produced between reflection from the lines and spaces, then grating 12 models a phase shift grating.

In the example of FIG. 1, grating 12 models a reflective diffraction grating. Light from a source 14 is incident on the surface of item 10. Typically, for simplicity of measurement calculations, the incident light is monochromatic and is normal to the surface of grating 12. Grating 12 reflects light to an optical sensor 16, which detects the intensities at various angles corresponding to the diffraction orders. Sensor 16 may be any optical receiving means that are known in the art of linewidth measurement with diffraction gratings.

Figure 2:
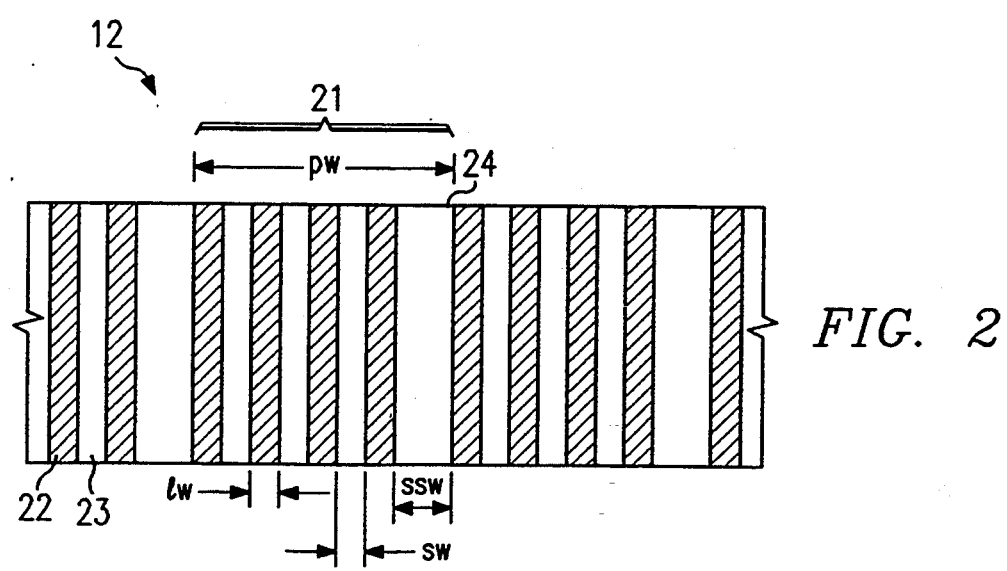
FIG. 2 illustrates a first type of multiple-order test grating.
Figure 3:
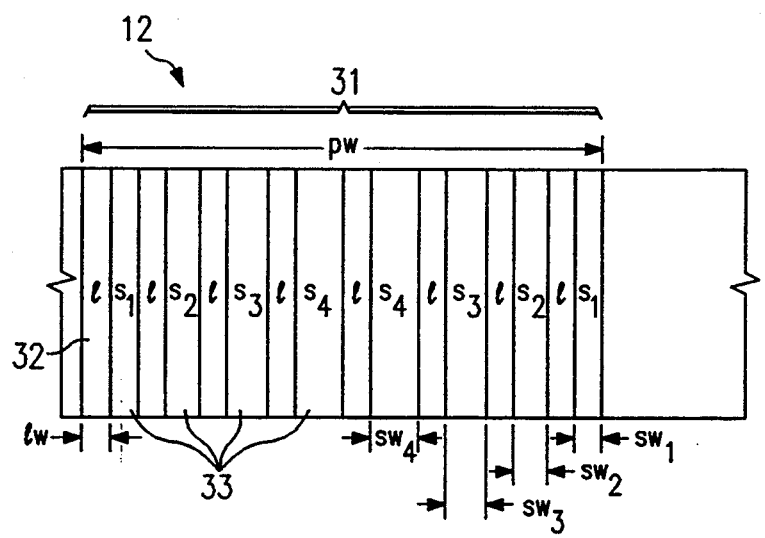
FIG. 3 illustrates a second type of multiple-order test grating.
Figure 4:
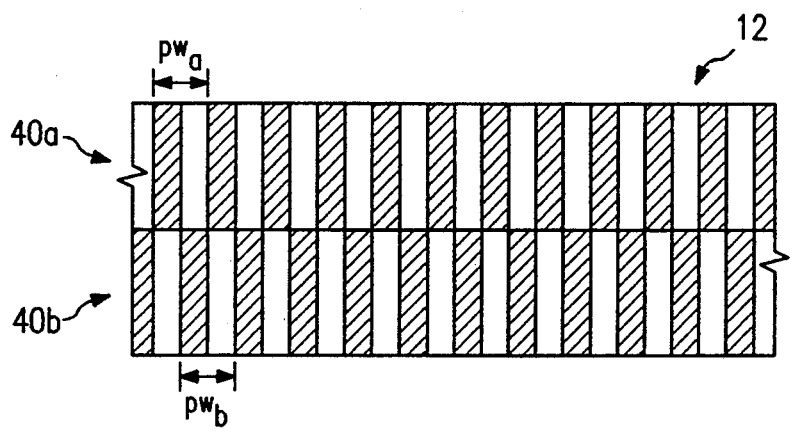
FIG. 4 illustrates a third type of multiple-order test grating.

FIGS. 2-4 illustrate three different embodiments of a multiple-order grating 12. A common feature of each of these embodiments is that they provide multiple diffraction orders, without having unduly large spacewidths. In each grating 12, the spacewidth is not substantially different from the linewidth.

As will be explained below, the gratings 12 may be thought of as "interleaved" sets of conventional gratings. The diffraction orders they produce are numerous and closely spaced.

In each grating 12, the lines have a linewidth, lw, which is similar to that of the production lines 11 on the production item 10. Typically, the grating lines will be made in the same manner as lines 11, so that they are "the same", which provides a direct inference between the measured linewidth of the grating and a width of a production line 11. Thus, $$lw_{grating} = > lw_{production}.$$

Each grating has a pitchwidth, pw, equal to the sum of the widths of some repeating pattern of lines and spaces. The linewidth, $lw_{grating}$, is the parameter to be measured.

It is assumed that the pitchwidth of each grating 12 is known, although the linewidth and spacewidths are not. In practice, when the invention is used for semiconductor fabrication measurements, pitchwidths are known from the mask layout. The mask is capable of accurately producing a desired pitchwidth. Or, pitchwidths can be calculated by measuring the distance between diffraction orders, using diffraction calculations that are well-known in the art to be accurate.

The use of the term "lines" to refer to the raised portions of a grating is somewhat arbitrary. The description herein, which is in terms of measuring "lines", is equally applicable to measuring spaces, and "line" is used herein to refer to either a raised line or a set-in space. In fact, in the most general sense, "line" is used to refer to any pattern of alternating reflectivities, transmissivities, or phase shifts, or other diffraction grating property.

Referring now to FIGS. 2 and 3, these embodiments are similar in that each has a pitch comprised of multiple lines and multiple spaces. Each pitch is comprised of a set of lines and spaces having a distinct pattern that repeats for each pitch. This is in contrast to a conventional grating, whose pitch is comprised of a single line and a single adjacent space.

The pitch can have any number of lines and spaces, with any distribution of spacewidth values between lines. For each pitch, the widths of its lines and spaces are summed to provide a pitchwidth that will result in the desired number of diffraction orders. The larger pitchwidth of grating 12 results in decreased separation of diffraction orders, and thus, more diffraction orders can be observed.

FIG. 2 is a plan view of a portion of a first multiple-order grating 12. Although grating 12 is shown with only two complete pitches 21, a typical grating 12 would have hundreds of pitches 21.

Each pitch 21 is comprised of a block of fixed-width lines 22 and fixed-width spaces 23 and an adjacent separation space 24. Lines 22 have equal linewidths, lw. Likewise, spaces 23 have equal spacewidths, sw. The linewidth may, but need not necessarily, be the same as the spacewidth.

The width, ssw, of separation space 24 is some factor, k, times the linewidth, lw. Where n lines 22 and spaces 23 are used in a pitch 21, the pitchwidth increases by a factor of n, as compared to a conventional grating, such as one whose pitch has one line 22 and one space 23. For normal incidence of the illuminating light, the number of diffraction orders also increases by n.

For measuring submicron linewidths, n is expected to be about 4–8. The separation spacewidth factor, k, will range from 1.5 to 3.

FIG. 3 is a plan view of a portion of another type of multiple-order grating 12. Grating 12 has a pitch 31 comprised of a repeating pattern of fixed-width lines 32 and variable-width spaces 33. Only one pitch 31 is shown; a complete grating 30 would have hundreds of pitches 31.

FIG. 3 is only one example of a grating 12 having a fixed-linewidth and variable-spacewidth. Many variations are possible, with the common characteristic being a repeating pattern that defines a known pitchwidth. Variations of grating 12 might have more lines and spaces in each pitch, and the spaces may vary by different amounts.

In the example of FIG. 3, each pitch 31 has four lines 32 and four spaces 33. The spaces 33 vary in width as follows:

$sw_1 = lw$
$sw_2 = 1.25\ lw$
$sw_3 = 1.5\ lw$
$sw_4 = 1.75\ lw$.

Thus, the pitchwidth increases by a factor of 9.5 over a conventional grating, such as one having a pitch with a single line 32 and a single space 33.

FIG. 4 illustrates another multiple-order grating 12. However, instead of producing multiple orders by means of a wider effective pitch, the grating of FIG. 4 produces multiple orders by means of multiple stacked gratings. As explained below, each grating in the stack produces diffraction orders.

The example of FIG. 4 has two grating strips 40a and 40b stacked adjacent to each other. The overall distance across gratings 40a and 40b is sufficiently small so that the incident beam simultaneously illuminates both gratings 40a and 40b. The grating strips 40a and 40b are stacked such that their lines and spaces are shifted.

In FIG. 4, the pitch of grating strip 40a is the same as that of grating strip 40b. However, in general, the pitchwidths vary from grating strip to grating strip. If the difference in pitches between the grating strips is delta d, then the effective pitch of the grating 12 increases by a factor of d / delta d. For example, for a 10% difference in pitches, the effective pitch increases by a factor of 10. The number of diffraction orders obtained is a function of the effective pitch.

Figure 5:
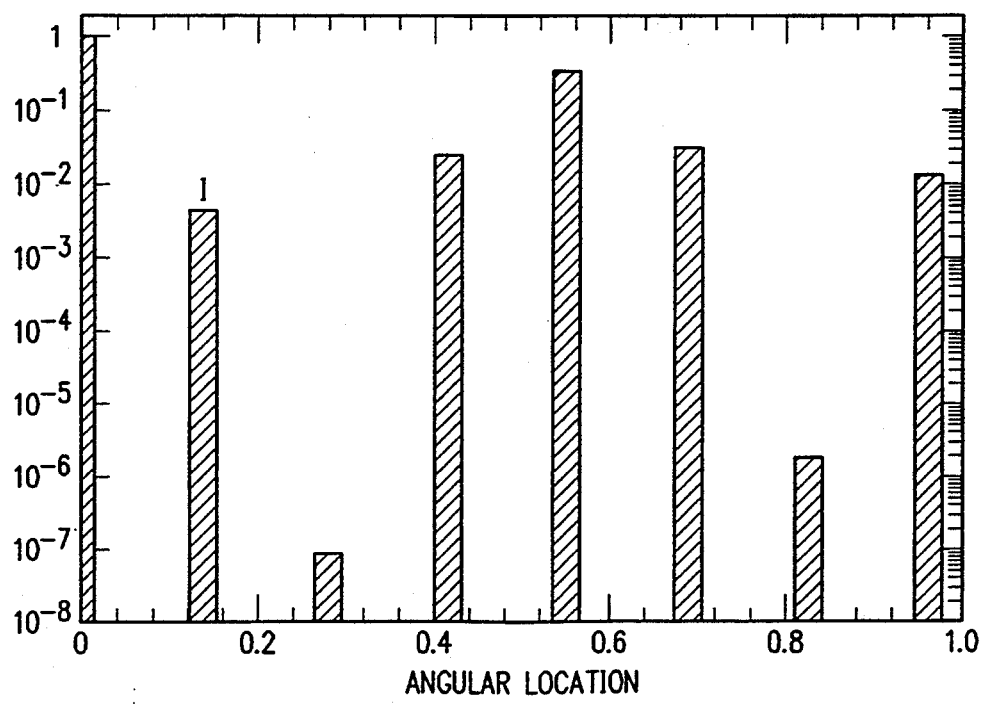
FIG. 5 illustrates multiple diffraction orders that result from illuminating the test gratings of FIGS. 2-4.

FIG. 5 illustrates a diffraction pattern, such as might result from illuminating any one of the embodiments of grating 12. Intensity measurements of various diffraction orders, in normalized units, are plotted against the location, in terms of angular position units. Each bar represents one diffraction order, with the zeroth order being at the "on axis" location.

In operation, it is assumed that there is sufficient contrast between lines and spaces, either in terms of reflectivity or transmissivity, to obtain a diffraction pattern. The discussion herein is in terms of Fraunhoffer diffraction, but if the Fraunhoffer limit does not apply, more complete theories of diffraction can be used.

As an overview of the method of using grating 12, it is illuminated with a monochromatic light source. To improve contrast, the incident light may be polarized. The resulting diffraction pattern is viewed on an image screen.

For purposes of explanation of FIG. 5, it is assumed that a grating such as grating 12 was used to produce the diffraction pattern. The linewidth is 350 nanometers. The width of the spaces follows the following sequence: 350, 450, 550, and 450 nanometers. This implies an effective pitch of 3200 nanometers. The incident light is a 441 nanometer laser.

The result is eight orders of diffraction, including the zeroth order. The location of each order is a function of the pitch. The relative intensities of each order depend on the spacewidths. Although two of the orders are weak and more difficult to measure, the six other orders can be used to determine the linewidth.

The multiple diffraction orders available from the different embodiments of grating 12 involve the use of fairly complex diffraction models. As stated in the background section of this patent application, many diffraction-based linewidth measurement methods currently in use rely on simplified diffraction models applicable to the simple standard grating structure that provides one or two diffraction orders. In contrast, the gratings of FIGS. 2–4 are more complex and provide multiple diffraction orders.

Use of each of the multiple-order grating 12 adheres to the basic idea that an analytical expression for the intensity of each order can be derived, using well known diffraction theory. In general, the expression for the intensities of the diffraction orders will have six unknowns: the intensity of the incident beam, the amplitude and phase of the reflection coefficients from the line and the space, and the linewidth. These are properties that can be assumed to be uniform across the grating. Each of the measured intensities of the various orders can be substituted into this expression. If intensity measurements from six diffraction orders are obtained, a set of six equations and six unknowns can be solved for linewidth.

An example of an expression derived for the standard grating, for the intensity, I, of the diffraction image at any order, m, is:

$$I(m) = C(1 + \cos \Theta)^2 N^2 \frac{\sin^2 (m\pi l/p)}{(m\pi l/p)^2}$$

$$(r_l^2 + r_s^2 - 2r_l r_s \cos(\phi_l - \phi_s)),$$

where C is a constant, $\Theta$ is the angle between the normal and the angular location of the diffraction order, N is the number of lines in the grating, l is the linewidth, p is the pitchwidth, $r_l$ and $r_s$ and $\Phi_l$ and $\Phi_s$ are the amplitude and phase of the reflection coefficients from the lines and spaces. Similar intensity expressions may be derived for each of the embodiments of FIGS. 2-4. If there are n unknown variables, the intensities of n diffraction orders are measured to solve the intensity expression for the unknown variables.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of determining an unknown linewidth on a surface having lines and spaces of different transmissivity or reflectivity, or other diffraction producing characteristic, comprising the steps of:
   making a grating on said surface, said grating having lines of a uniform unknown width, and having a plurality of pitches wherein each of said plurality of pitches is comprised of multiple lines, fixed-width spaces and an adjacent separation space, wherein said fixed-width spaces have known widths in patterns that repeat for each of said plurality of pitches, such that said grating produces multiple diffraction orders when illuminated;
   illuminating said grating with incident light;
   measuring the intensity from each of said diffraction orders;
   substituting said values in a mathematical expression representing intensity for each of said diffraction orders, wherein said mathematical expression is derived using well known diffraction theory, such that as many of such expression; are obtained as are unknown variables in said expression; and
   solving said expressions for said unknown linewidth.

2. The method of claim 1, wherein each of said plurality of pitches has spaces that vary in a pattern that repeats for each pitch.

3. The method of claim 1, wherein said spaces have a uniform width throughout said grating.

4. The method of claim 1, wherein said lines and spaces have the same uniform width throughout said grating.

5. The method of claim 1, wherein said separation space has a uniform width throughout said grating.

6. The method of claim 1, wherein said step of making a grating further comprises making said grating with each of said plurality of pitches has spaces that vary in a pattern that repeats for each of said plurality of pitches.

7. The method of claim 1, wherein said step of making a grating comprises making the grating lines in the same manner as other lines on said surface that are not in the grating whose width is unknown, such that the linewidth of the latter can be inferred from the linewidth of said grating lines.

8. The method of claim 1, wherein said width of said adjacent separation space is a factor k, times the width of said lines of uniform unknown width wherein said factor k is in a range from 1.5 to 3.

9. A test structure for determining the width of production lines on a production surface, comprising:
   a test grating having grating lines with the same unknown linewidth, and having a plurality of pitches wherein each pitch of said plurality of pitches is comprised of multiple lines, fixed-width spaces and an adjacent separation space, wherein said fixed-width spaces have widths in patterns that repeat for each of said plurality of pitches, such that said grating produces multiple diffraction orders when illuminated;
   wherein said grating lines are made on said surface, in the same manner as said production lines, such that the width of said production lines can be inferred from the linewidth of said grating lines.

10. The test structure of claim 9, wherein said spaces have a uniform width throughout said grating.

11. The test structure of claim 9, wherein said lines and said spaces have the same uniform width throughout said grating.

12. The test structure of claim 9, wherein said separation space has a uniform width throughout said grating.

13. A method of determining an unknown linewidth on a surface having lines and spaces of different transmissivity or reflectivity, or other diffraction producing characteristic, comprising the steps of;
   making a first grating strip on said surface, said grating having lines of a uniform unknown width, and having a pitch of a known width;
   making a second grating strip on said surface, said grating having lines of the same uniform unknown width as said first grating strip, and having a pitch of a known width;
   wherein said first strip and said second strip are adjacent to each other such that the lines of one are parallel but shifted with respect to the lines of the other, such that said first and second grating strips produce multiple diffraction orders when illuminated;
   illuminating said grating strips with incidend light;
   measuring the intensity from each of said diffraction orders;
   substituting said measured values in a mathematical expression representing intensity for each of said diffraction orders, wherein said mathematical expression is derived using well known diffraction theory, such that as many of such expressions are obtained as are unknown variables in said expression; and
   solving said expressions for said unknown linewidth.

14. The method of claim 13, wherein said step of making said first and said second grating strips further comprises making the pitches of the same width.

15. The method of claim 13, wherein said step of making said first and said second grating strips further comprises making their pitches of different widths.

16. The method of claim 13, and further comprising the step of making a third or more gratings strips for producing additional diffraction orders.

17. A test structure for determining the width of production lines on a production surface, comprising:
- a first test grating strip having grating lines with the same unknown linewidth, and having a known pitchwidth;
- a second test grating strip having lines of the same uniform unknown width as said first grating strip, and having a pitch of a known width;
- wherein said first strip and said second strip are adjacent to each other such that the lines of one are parallel but shifted with respect to the lines of the other, such that said first and second grating strips produce multiple diffraction orders when illuminated;
- wherein said grating lines are made on said surface, in the same manner as said production lines, such that the width of said production lines can be inferred from the linewidth of said grating lines.

18. The test structure of claim 17, wherein said first and said second grating strips have pitches of the same width.

19. The test structure of claim 17, wherein said first and said second grating strips have pitches of different widths.

20. The test structure of claim 17, and further comprising a third or more gratings strips having lines of the said unknown width, for producing additional diffraction orders.

* * * * *